Aug. 29, 1950     W. O. NELSON     2,520,427  
RAZING TOOL  
Filed June 5, 1947
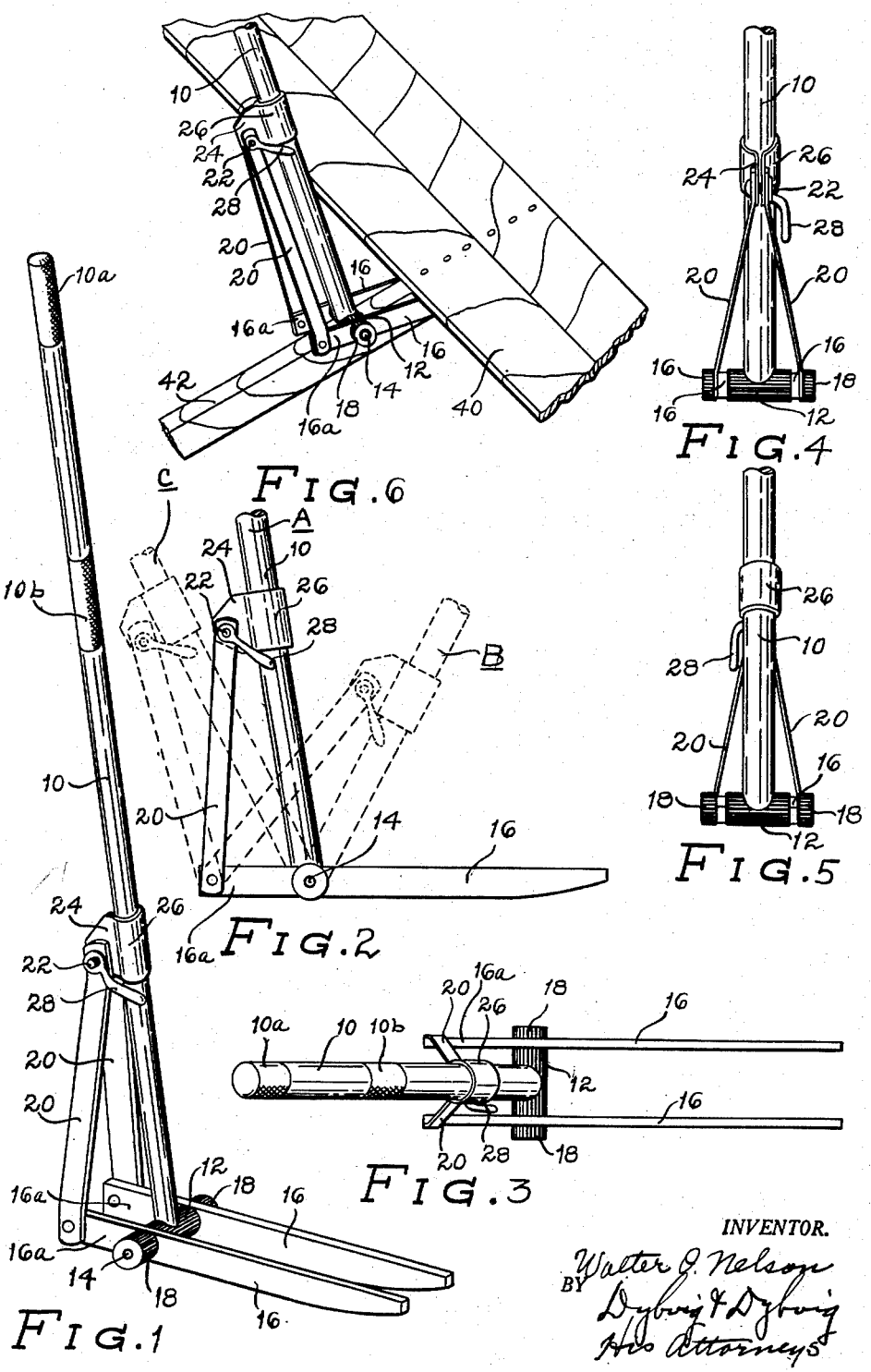
INVENTOR.  
Walter O. Nelson  
BY Dybvig & Dybvig  
His Attorneys Patented Aug. 29, 1950

2,520,427

UNITED STATES PATENT OFFICE 2,520,427

RAZING TOOL

Walter O. Nelson, East Grand Forks, Minn.

Application June 5, 1947, Serial No. 752,654

4 Claims. (Cl. 254—131)

This invention relates to a razing tool and more particularly to a razing tool adapted for use in wrecking or altering frame buildings, although not necessarily so limited.

An object of this invention is to provide a tool that is convenient to use in wrecking buildings and in making alterations therein, which tool is adapted to remove boards, planks and the like with ease and without splitting, cracking or otherwise mutilating the lumber.

Another object of this invention is to provide a wrecking tool that is adjustable into a plurality of positions so that it may be used in removing boards, planks and the like in various relative positions with respect to the mechanic. This tool may also be adjusted so as to permit the approach from various angular positions. Thus, it may be used in spite of obstacles that would normally be in the way in the event the tool were not made adjustable.

Other objects and advantages reside in the construction of parts, the combination thereof and the mode of operation, as will become more apparent from the following description.

In the drawings,

Figure 1 is a perspective view of the razing tool.

Figure 2 is a fragmentary side elevational view showing the razing tool in several adjusted positions.

Figure 3 is a top plan view of the razing tool, as viewed from the top of Figure 1.

Figure 4 is a fragmentary rear elevational view, as viewed from the left of Figure 2.

Figure 5 is a front, fragmentary, elevational view, as viewed from the right of Figure 2.

Figure 6 is a fragmentary, perspective view showing the tool in position for prying loose a board.

Referring to the drawings, the reference numeral 10 indicates the main handle of a razing tool. This handle has preferably knurled areas 10a and 10b, forming convenient hand grip areas. The lower end of the handle 10 is fixedly attached to a spacer member 12 terminating in a pair of threaded stud-like projections 14.

A pair of parallel fork-like members 16 are provided with apertures through which the projections 14 extend. These fork-like members 16 are held in position by suitable nuts 18, threadedly engaging the projections. The fork-like members 16 have rearwardly extending portions 16a pivotally attached to a pair of reinforcing arms 20. The upper ends of the arms 20 are attached by means of a suitable bolt 22 to flanges 24 of a split collar 26 encircling the handle 10. A suitable wrench-like nut 28 is used in tightening the bolt 22, so as to rigidly clamp the split collar 26 upon the handle 10.

By loosening the nut 28, the split collar 26 may be moved upwardly or downwardly upon the handle 10, so as to adjust the angular relation of the fork-like member 16 with respect to the handle 10, as clearly shown in Figure 2. The fork-like member 16 may be adjusted into various positions, one indicated by A, another position indicated by B and a third position indicated by C. For example, if boards are to be removed from a wall near the ground or near the plane of the surface upon which the operator stands, the razing tool is preferably adjusted into the position B, so that the handle 10 projects upwardly so as to permit the fork-like members 16 to be inserted below the board to be removed. On the other hand, if the operator desires to remove boards from a wall wherein the boards are comparatively high, the razing tool may be adjusted into the position C, so as to permit the insertion of the fork-like members 16 under the board from below, at which time the handle 10 projects downwardly within reach of the mechanic or operator. These various positions may also be used depending upon the relative position of the operator with respect to the work when removing flooring or roofing or sheeting from an inclined roof.

In Figure 6 the razing tool has been shown in a position to remove a board 40 nailed to a frame member 42, showing the razing tool in position in readiness to pry the board off of the frame member.

Although the fork-like members 16 have been shown as straight members, these could have a curvature, so that when projected under a board they could be substantially parallel to the line of contact between the board and the frame member. However, in razing heavy material or in razing buildings where the nails have rusted, it would then be advantageous to have them straight, so as to first exert the fork against the edge of the board or plank to be removed, the shape depending entirely upon the use to which the tool is to be put.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A razing tool for use in removing a board-like member from a supporting frame member, including a handle, a pair of fork-like members, means for pivotally attaching the fork-like members to the opposite sides of one end of the handle so as to cause the fork-like members to project in parallel spaced relation from the end of the handle, a pair of arms pivotally engaging the fork-like members, and means engaging the handle for adjustably attaching said arms thereto, the adjustment of said last mentioned means determining the angular relation between the fork-like members and the handle.

2. A razing tool for use in removing a board-like member from a supporting frame member, including a handle, a pair of fork-like members for engaging the board-like member to be removed, a spacer member fixedly attached to the end of the handle for adjustably supporting the fork-like members parallel to each other and in fixed spaced relation so as to permit the fork-like members to straddle the supporting frame member, and means including a split collar surrounding the handle for holding the fork-like members in any adjusted position with respect to the handle, the adjustment of the collar upon the handle adjusting the angular position of the fork-like members with respect to the handle.

3. A razing tool for use in removing a board-like member from a supporting frame member including a handle, a pair of fork-like members for engaging the board-like member to be removed, a spacer member fixedly attached to the end of the handle for adjustably supporting the fork-like members parallel to each other and in fixed spaced relation so as to permit the fork-like member to straddle the supporting frame member, a pair of arms pivotally engaging the fork-like members, and means engaging the handle for adjustably attaching said arms thereto, the adjustment of said last mentioned means with respect to the handle determining the angular relation between the fork-like members and the handle.

4. A razing tool for use in removing a board-like member from a supporting frame member including a handle, a pair of fork-like members for engaging the board-like member to be removed, a spacer member fixedly attached to the end of the handle for adjustably supporting the fork-like members parallel to each other and in fixed spaced relation so as to permit the fork-like members to straddle the supporting frame member, and means for holding the fork-like members in any adjusted position with respect to the handle, said last mentioned means including a pair of arms pivotally engaging the fork-like members and means for adjustably attaching said arms to the handle, the adjustment of said last mentioned means determining the angular relation between the fork-like members and the handle.

WALTER O. NELSON.

REFERENCES CITED

The following references are of record in the file of this patent:

UNITED STATES PATENTS

| Number | Name | Date |
| --- | --- | --- |
| 930,784 | Nelson | Aug. 10, 1909 |
| 2,195,667 | Baker | Apr. 2, 1940 |
| 2,374,530 | Fibke | Apr. 24, 1945 |